United States Patent
Mason

(10) Patent No.: US 10,882,081 B2
(45) Date of Patent: Jan. 5, 2021

(54) CHEMICAL COMPOSITIONS AND METHOD FOR DEGASSING OF PROCESSING EQUIPMENT

(71) Applicant: FQE CHEMICALS INC., Calgary (CA)

(72) Inventor: Douglas J. Mason, Deer Park, TX (US)

(73) Assignee: FQE CHEMICALS INC., Calgary (CA)

( * ) Notice: Subject to any disclaimer, the term of this patent is extended or adjusted under 35 U.S.C. 154(b) by 34 days.

(21) Appl. No.: 16/432,743

(22) Filed: Jun. 5, 2019

(65) Prior Publication Data

US 2019/0300826 A1     Oct. 3, 2019

Related U.S. Application Data

(62) Division of application No. 15/291,248, filed on Oct. 12, 2016, now Pat. No. 10,486,201.

(51) Int. Cl.

| | | |
|---|---|---|
| *B08B 3/08* | (2006.01) | |
| *C11D 3/30* | (2006.01) | |
| *C11D 3/32* | (2006.01) | |
| *C11D 3/34* | (2006.01) | |
| *C11D 11/00* | (2006.01) | |
| *C11D 3/20* | (2006.01) | |
| *C11D 1/72* | (2006.01) | |
| *B01D 53/14* | (2006.01) | |
| *B01D 53/72* | (2006.01) | |
| *C11D 3/33* | (2006.01) | |
| *C11D 7/32* | (2006.01) | |
| *C11D 7/34* | (2006.01) | |

(52) U.S. Cl.
CPC ............... *B08B 3/08* (2013.01); *B01D 53/14* (2013.01); *B01D 53/1487* (2013.01); *B01D 53/1493* (2013.01); *B01D 53/72* (2013.01); *C11D 1/72* (2013.01); *C11D 3/2068* (2013.01); *C11D 3/30* (2013.01); *C11D 3/32* (2013.01); *C11D 3/33* (2013.01); *C11D 3/3427* (2013.01); *C11D 7/3218* (2013.01); *C11D 7/3263* (2013.01); *C11D 7/34* (2013.01); *C11D 11/0041* (2013.01); *B01D 2252/2026* (2013.01); *B01D 2252/2053* (2013.01); *B01D 2252/2056* (2013.01); *B01D 2252/20484* (2013.01); *B01D 2252/20489* (2013.01); *B01D 2252/60* (2013.01); *B01D 2257/702* (2013.01)

(58) Field of Classification Search
CPC .......... C11D 3/32; C11D 3/33; C11D 3/3427; C11D 1/72; C11D 7/3218; C11D 7/3263; C11D 7/34; B08B 3/08; B01D 53/14
USPC ............... 510/234, 492, 499, 501, 505, 506; 261/47, 48

See application file for complete search history.

(56) References Cited

U.S. PATENT DOCUMENTS

| | | | |
|---|---|---|---|
| 4,511,480 A * | 4/1985 | Outlaw | C07F 9/091 252/389.21 |
| 5,356,482 A | 10/1994 | Mehta et al. | |
| 5,425,814 A | 6/1995 | Krajicek et al. | |
| 5,776,257 A | 7/1998 | Arnold et al. | |
| 6,872,263 B1 | 3/2005 | Jansen et al. | |
| 6,893,509 B2 | 5/2005 | Sears et al. | |
| 6,905,577 B1 | 6/2005 | Salama | |
| 8,480,812 B2 | 7/2013 | Nath et al. | |
| 8,491,721 B2 | 7/2013 | Ortega et al. | |
| 2012/0219480 A1 | 8/2012 | Simpson et al. | |
| 2013/0087511 A1 | 4/2013 | Ledebuhr et al. | |

FOREIGN PATENT DOCUMENTS

WO     2011145122 A1     11/2011

* cited by examiner

*Primary Examiner* — Gregory R Delcotto
(74) *Attorney, Agent, or Firm* — Field LLP

(57) ABSTRACT

A chemical composition for use in degassing of vessels is taught, said chemical composition including 1-10% by weight of an oxyalkylated dodecyl thiol; and 1-20% by weight of an alkyl di-substituted 9-decenamide. A method is further provided for degassing a vessel. The method includes charging said vessel with chemical composition and a carrier medium, wherein said chemical composition comprises 1-10% by weight of an oxyalkylated dodecyl thiol and 1-20% by weight of an alkyl di-substituted 9-decenamide.

26 Claims, No Drawings

CHEMICAL COMPOSITIONS AND METHOD FOR DEGASSING OF PROCESSING EQUIPMENT

FIELD OF THE INVENTION

The present invention relates to chemical cleaning compositions and methods for removing fouling in the form of hazardous vapors and residual hydrocarbon liquids from petroleum refining, chemical, petrochemical and manufacturing processing equipment.

BACKGROUND OF THE INVENTION

In the many chemical industries, maintenance and capital improvements occur on a scheduled basis. Operating units including various types of vessels from tanks to towers to heat exchangers to distillation columns and other types of equipment are maintained as part of an effort called a turn-around.

During a turn-around, an operating process vessel cannot be merely shutdown and drained before personnel entry for maintenance. The vessel must first be decontaminated of any residual materials in it, which may render the vessel harmful for workers to enter.

During a turnaround, and before internal mechanical maintenance is performed of any kind, a cleaning must take place which frees all the internal surfaces of the process equipment from contaminants. These internal surfaces may include the walls of the vessel cylinder, the tops and bottoms of trays, packing sections (loose or fixed), spargers, pump-around piping, and especially the bottom third of the vessel. The bottom section is typically very difficult to clean since heavier chemicals tend to settle and accumulate in this area.

The contaminants removed are often hydrocarbons. These hydrocarbons will vary in size, length, molecular weight and structure. The industry commonly categorizes hydrocarbons into Light ends, Medium cuts and Heavy cuts. Light ends would be cuts like methane, propane, ethane, and the like. Medium cuts would include kerosene, gasoline, and diesel, among others. Heavy cuts would include lubricants, waxes and asphalt.

There are several methods for cleaning pressurized vessels known in the prior art including liquid circulation of aqueous solutions of cleaning chemicals and the injection of cleaning chemicals into steam sparged through the equipment to effect decontamination. The prevalent process used for decontamination is through steam injection, also called vapor-phase cleaning.

In vapor-phase cleaning, a chemical is injected into a steam stream that is sparged through the equipment over a period of time. The chemicals used for this purpose are often termed as degassing products intended for use in the removal of the hazardous gases, such as hydrogen sulfide, ammonia and light hydrocarbons such as benzene. While deemed degassing chemicals, the process is primarily intended to remove residual liquid hydrocarbon oils from the equipment. In doing so, the residual oils that are the source of gas generation within equipment, are removed thereby allowing for more rapid gas elimination via steam pressure.

Rapid removal of the residual hydrocarbon liquids is an important component in the time efficient application of the degassing process. Otherwise, residual liquid hydrocarbons volitalize and become the source of continued evolution of hazardous vapors. Without the removal of the residual hydrocarbon liquids, otherwise known as degreasing, the decontamination process often would require long periods of time, days even, before the equipment could be authorized for safe entry.

While simple and relatively inexpensive, the cleaning performance of high-pressure steam is very poor. By itself, the steam process will not reduce the hydrocarbon gas. Therefore, the vessel is usually opened to the atmosphere until the hydrocarbon gas has volatilized and moved out of the vessel. This airing out process may take as long as two days.

Another method incorporates liquid cleaning with a caustic solution. Caustic solution cleaning begins like the basic steam cleaning method—with a reduced crude wash. After the reduced crude wash, caustic or high-pH chemicals are circulated through the vessel. Due to the high pH of the caustic chemical, effluent generated during the caustic wash must be neutralized with an acid to neutralize the pH before the significant quantities of effluent are sent to a wastewater-treatment plant for processing. Additional processing may be required if the caustic chemicals contain phosphates, silicates, or other chelating agents that can interfere with the waste-treatment process.

Yet another method involves an organic solvent wash. This method, like the first two, begins with a reduced crude wash. Next, organic solvents are circulated through the vessel from top to bottom. Although these organic solvents may satisfactorily remove oils, they do not have the solvency strength necessary to thoroughly clean the vessels while in a liquid phase. Solvent circulation can last as long as 24-48 hours. After the liquid phase cleaning, a water rinse is used to remove organic contamination from the vessel. Since organics by nature are not water soluble, rinsing with water is time-consuming, inefficient, and very difficult. Additionally, it is extremely difficult to determine whether these potentially harmful organics have been completely removed by the rinse process.

In summary, each of these prior art methods require that the vessel be exposed to the atmosphere to remove harmful gas and then manually cleaned to remove contamination.

One alternative procedure envisages inertisation of the atmosphere inside the tank before degassing, for example by introducing nitrogen or argon into the tank through tank openings.

As well as being expensive this operation may considerably lengthen degassing times. In fact, inertisation requires the prior sealing of all the gaskets of the tank, including the legs supporting the mobile roof. The vaporisation of the nitrogen, the dispersion of the nitrogen inside of the tank and periodic tests of control to check the level of inertisation achieved, all add to the length of the degassing procedure.

U.S. Pat. No. 6,893,509 B2 (Sears et al., 2005) teaches a process of injecting a terpene and a surfactant package into high-pressure steam, and introducing the steam and chemistry mixture into the equipment to clean its inside surfaces.

U.S. Pat. No. 8,480,812 (Nath et al., 2013) teaches a cleaning agent containing one or more solvents, such as terpenes or other organic solvents. The cleaning agent is injected into contaminated equipment, along with a carrier gas, in the form of a cleaning vapor. The carrier gas may be nitrogen or other inert gases.

WO 2011145122 A1 (2011, Rancich) teaches a method of introducing an atomised aqueous mixture which interacts chemically and/or physically with VOC (volatile organic compounds) in the gaseous state inside a tank, so as to encourage them to pass from the gaseous phase to the liquid phase, and to remain in the liquid phase. Aqueous mixture comprises one or more surfactant substances and chelating substances that aid in VOC absorption.

U.S. Pat. No. 8,491,721 (Ortega et al., 2013) provides a method for cleaning storage tank by mixing a high-powered emulsifying agent with the residual of water, solids, and trace amounts of hydrocarbons to substantially emulsify the hydrocarbons.

U.S. Pat. No. 6,905,577 (Salama, 2005) teaches the use of an electrical corona discharge reactor capable of producing ozone for the oxidation of VOC's, as well as other undesirable compounds such as $H_2S$, $NH_4$, mercaptans, and chlorinated solvents which can be present in gaseous effluents.

U.S. Pat. No. 5,776,257 (Arnold et al., 1998) Teaches a method of removing VOC's from a tank by repetitive spraying of diesel mist which is allowed to settle. This permits the diesel spray to act as a sponge and remove gaseous airborne VOC's in the tank.

US 20130087511 A1 (Ledebuhr et al., 2013) teaches VOC removal from flowback water stored in holding tanks. A portion of the contained water is routed and pumped to an atomizer at the top of the tank in the space above the contained water thus creating a mist of very fine droplets that capture VOC vapors.

U.S. Pat. No. 5,356,482 (Mehta et al., 1994) teaches a liquid-steam method using terpenes to detoxify the insides of a vessel to remove dangerous and explosive gases. Specifically, it involves use of steam acids alkalies or wetting agents to decontaminate the vessels.

U.S. Pat. No. 5,425,814 (Krajicek et al., 1995) teaches using an aqueous solution at an elevated temperature, of an extractant, such as a terpene, and a surfactant mixture which extracts and traps contaminants.

U.S. Pat. No. 6,872,263 (Jansen et al., 2005): the present invention employs a naturally occurring organic solvent as a cleaning agent injected directly into one or more high-pressure steam lines already present in the refinery's system. The cleaning agent and stream mix as vaporized and allowed to enter into the equipment where upon it cleans all surfaces inside the equipment.

SUMMARY

A chemical composition is provided for use in degassing of vessels is taught, said chemical composition comprising 1-10% by weight of an oxyalkylated dodecyl thiol; and 1-20% by weight of an alkyl di-substituted 9-decenamide.

A method is further provided for degassing a vessel. The method comprises charging said vessel with chemical composition and a carrier medium, wherein said chemical composition comprises 1-10% by weight of an oxyalkylated dodecyl thiol and 1-20% by weight of an alkyl di-substituted 9-decenamide.

It is to be understood that other aspects of the present invention will become readily apparent to those skilled in the art from the following detailed description, wherein various embodiments of the invention are shown and described by way of illustration. As will be realized, the invention is capable for other and different embodiments and its several details are capable of modification in various other respects, all without departing from the spirit and scope of the present invention. Accordingly the drawings and detailed description are to be regarded as illustrative in nature and not as restrictive.

DETAILED DESCRIPTION OF THE INVENTION

The description that follows and the embodiments described therein are provided by way of illustration of an example, or examples, of particular embodiments of the principles of various aspects of the present invention. These examples are provided for the purposes of explanation, and not of limitation, of those principles and of the invention in its various aspects.

The present invention relates to improvements in the degassing of process equipment and vessels to decontaminate them to allow for human entry, by use of chemical compositions designed to enhance the removal of residual hydrocarbon liquids. The present composition can be applied in a carrier medium wherein the carrier medium can be in either the vapour or liquid phases.

The present inventors have discovered that a combination of an oxyalkylated thiol and a substituted 9-decenamide when injected with steam or liquid, produce exemplary performance in degreasing typical processing equipment and thereby significantly reducing the time required to decontaminate processing equipment during typical degassing operations.

The present composition has also been surprisingly found to show good performance in degassing, that is removal of the hazardous gases, together with the necessary degreasing, or removal of liquid hydrocarbons, that are both required to sufficiently clean a vessel for human entry. The present inventive process can be conducted without the need for airing out of the vessel or exposing it to atmosphere.

The use of the present composition in degassing applications, wherein the present composition performs both degassing and degreasing functions leads to fewer degassing steps, fewer separate chemicals for degassing and degreasing and less time in preparing vessels for human entry. The present composition has shown strong efficacy and efficiency in degassing, reducing degassing time and speeding up the turn-around process.

The chemical compositions of the present invention may preferably include a vapour absorbent having an affinity for vapor-state hydrocarbons molecules. The optional vapour absorbent aides in the expedient removal of hazardous gases.

In performing the process of the present invention, the chemical composition as described above can be applied in a number of means including vapour phase application in which either steam or a gas such as nitrogen carries the composition; and also liquid phase application in which the composition is added to water. The water can be any kind of available water source at the processing facility, including firewater.

Liquid circulation involves filling the process equipment substantially fully with an aqueous solution of the present composition and circulating the liquid around the vessel by any known means in the art. Alternative, liquid cascade involves filling the process equipment only part way with an aqueous solution of the present composition and spraying the aqueous solution up to a top of the equipment and allowing the aqueous solution liquid to cascade down the walls of the equipment. Preferably in a liquid cascade application, the process equipment is filled to about 25-35% of the equipment's volume.

In the case of steam injection the present composition can be injected in an amount of from about 0.2 to 0.5 pounds of composition per pound of steam and preferably from 0.25 to 0.35 pounds of composition per pound of steam.

When added in with a liquid for liquid circulation or liquid cascade, the present composition is added at amounts that preferably result in an effective concentration from about 1.5% to about 5% by volume and preferably from about 2.5% to 4% by volume of composition in the circulating liquid. In embodiments when the present composition is applied in a liquid phase, the aqueous solution of the present composition liquid is preferably heated, more preferably to a temperature of about 140 F to about 180 F (about 60 C to about 82 C) and most preferably from about 160 F to 170 F (about 71 C to about 77 C).

In some embodiments, when the processing equipment is a tower, column, or any other large vertical vessel, liquid cascading is a preferred use of the present composition since less volume of the cleaning composition and circulating liquid needs to be added to these larger vessels. In such cases the volume of the present composition and circulating liquid is preferably from about 25% to about 35% of the tower volume. Preferably the circulating liquid is circulated through the tower through a circulation loop at a rate sufficient to flood packings and trays of the tower, most preferably at a minimum rate of 1,000 GPM.

The waste liquid resulting from the spent aqueous solution of the present composition in both liquid circulation and liquid cascading operations can be sent directly to conventional waste water treatment without the need for additional pre-treatments.

The chemical composition of the present invention comprises:
  a) 1-10% by weight of an oxyalkylated dodecyl thiol; and
  b) 1-20% by weight of an alkyl di-substituted 9-decenamide.

Preferably the molar percentage of ethylene oxide in the oxyalkylated dodecyl thiol ranges from 45-70% by weight. Further preferably, the concentration of the oxyalkylated dodecyl thiol in the present composition is 1 to 3% by weight.

Preferably, the alkyl di-substituted 9-decenamide comprises alkyl groups that include but are not limited to: dimethyl; dimethyl 1-3 oxo; Cis, 9,10 Octa; (Z)octa, 4-hydroxy-3 methoxyphenyl; 2-methyl-3,8-dioxa. Further preferably the alkyl group is in the form of dimethyl groups on the terminal nitrogen. The concentration of the alkyl di-substituted 9-decenamide is more preferably from about 2-5% by weight of the present composition.

The composition of the present invention may also include any number of further surfactants, pH adjustment agents, hydrotrope agents and other elements that would be well understood by a person of skill in the art to not detrimentally affect performance of the present composition. There are other ingredients that can be substituted for the non-essential elements listed below, that can stabilize the mixture and not negatively affect the performance.

For example, glycol ether may be added with the general formula:

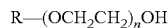

wherein R=methyl, ethyl, butyl, propyl, hexyl
n=1,2,3

More preferably, the glycol ether is added to make up 1 to 10% by weight of the chemical composition. Further optionally, a non-ionic surfactant can be added, preferably to make up from 2-15% by weight of the composition. The non-ionic surfactant may preferably be comprised of $C_8$-$C_{12}$ alkylphenol-ethylene oxide adducts, wherein the molar percentage of ethylene oxide ranges preferably from 55-75% and the weight percentage of the adduct ranges from 10-40%.

Further preferably, 1-10% by weight of a castor oil-ethylene oxide adduct may be added, wherein the adduct is made up of about 60% by weight ethylene oxide. Any number of suitable agents may be used for pH adjustment to a preferable range of 9-11. The pH agent is more preferably in the form of an alkaline additive that is most preferably a mono or diethanolamine. Optionally, any number of suitable hydrotrope agents can also be added to insure uniformity of solution. Preferably the hydrotrope agent is sodium xylene sulfonate at concentrations sufficient to produce a clear, homogenous liquid typically from about 1-10% by weight. Suitable phosphate ester products may be substituted for the preferred hydrotroping agent without negative effect on performance.

The above are illustrative and not intended to limit the scope of the present invention. This invention may be embodied in many different forms and should not be construed as limited to the embodiment set forth above. It will be recognized by those skilled in the art that other suitable forms of substituted 9-decenamide may be interchanged for those materials herein disclosed and other suitable forms of oxyalkylated thiol may be substituted without ill effect nor depart from the nature of the invention.

The previous description of the disclosed embodiments is provided to enable any person skilled in the art to make or use the present invention. Various modifications to those embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims. No claim element is to be construed under the provisions of 35 USC 112, sixth paragraph, unless the element is expressly recited using the phrase "means for" or "step for".

The invention claimed is:

1. A chemical composition for use in degassing of vessels, said chemical composition comprising:
  a) 1-10% by weight of an oxyalkylated dodecyl thiol; and
  b) 1-20% by weight of an alkyl di-substituted 9-decenamide.

2. The composition of claim 1, wherein said composition further comprises an alkaline additive to adjust the pH of the composition to a range of from 9 to 11.

3. The composition of claim 2, wherein the alkaline additive is selected from a monoethanolamine or diethanolamine.

4. The composition of claim 1, wherein said composition further comprises from 1 to 10% by weight of a glycol ether with the general formula:

wherein
  R=methyl, ethyl, butyl, propyl, hexyl
  n=1, 2, 3.

5. The composition of claim 1, wherein said composition further comprises from 2-15% by weight of a non-ionic surfactant comprised of $C_8$-$C_{12}$ alkylphenol-ethylene oxide adducts, wherein the molar percentage of ethylene oxide ranges from 55-75% and the weight percentage of the adduct ranges from 10-40%.

6. The composition of claim 1, wherein said composition further comprises 1-10% by weight of a castor oil-ethylene oxide adduct of about 60% by weight ethylene oxide.

7. The composition of claim 1, wherein the alkyl groups of the alkyl di-substituted 9-decenamide are selected from the group consisting of dimethyl; dimethyl 1-3 oxo; Cis, 9,10 Octa; (Z)octa, 4-hydroxy-3 methoxyphenyl; and 2-methyl-3,8-dioxa.

8. The composition of claim 7, wherein the alkyl di-substituted 9-decenamide comprises a dimethyl group on the terminal nitrogen, as the alkyl groups.

9. The composition of claim 8, wherein the composition comprises from about 2% to about 5% by weight of alkyl di-substituted 9-decenamide.

10. The composition of claim 1, further comprising a hydrotrope agent that is selected from the group consisting of sodium xylene sulfonate and a phosphate ester product.

11. The composition of claim 10, wherein the hydrotrope agent at a concentration of from about 1% to about 10% by weight.

12. The composition of claim 1, wherein the molar percentage of ethylene oxide in the oxyalkylated dodecyl thiol ranges from 45-70%.

13. The composition of claim 12, wherein the concentration of the oxyalkylated thiol in the composition is from 1% to about 3% by weight.

14. The composition of claim 1, further comprising a vapour absorbent having an affinity for vapor-state hydrocarbons molecules.

15. The composition of claim 1, wherein the composition is injected with steam into the vessel for degassing the vessel.

16. The composition of claim 15, wherein the chemical composition is injected in an amount of from about 0.2 to 0.5 pounds of composition per pound of steam, into the vessel.

17. The composition of claim 15, wherein the chemical composition is injected in an amount of from 0.25 to 0.35 pounds of composition per pound of steam.

18. The composition of claim 1, wherein the chemical composition is added with a circulating liquid, to the vessel.

19. The composition of claim 18, wherein the chemical composition is added at amounts of from about 1.5% to about 5% by volume of composition in the circulating liquid.

20. The composition of claim 18, wherein the chemical composition is added at amounts of from about 2.5% to 4% by volume of composition in the circulating liquid.

21. The composition of claim 18, wherein the circulating liquid is heated.

22. The composition of claim 21, wherein the circulating liquid is heated to a temperature of about 140 F to about 180 F.

23. The composition of claim 22, wherein the circulating liquid is heated to a temperature of from about 160 F to 170 F.

24. The composition of claim 18, wherein the vessel to be degassed is a tower and wherein the volume of the chemical composition and circulating liquid makes up from about 25% to 35% of the tower volume.

25. The composition of claim 24, wherein the chemical composition and the circulating liquid is circulated through the tower at a circulation rate to flood packings and trays of the tower.

26. The composition of claim 25, wherein the chemical composition and the circulating liquid are circulated at a minimum rate of 1,000 GPM.

* * * * *